United States Patent
Surkov

(10) Patent No.: US 9,563,940 B2
(45) Date of Patent: *Feb. 7, 2017

(54) SMART IMAGE ENHANCEMENTS

(71) Applicant: Ditto Technologies, Inc., San Francisco, CA (US)

(72) Inventor: Sergey Surkov, Foster City, CA (US)

(73) Assignee: Ditto Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,363

(22) Filed: Dec. 15, 2015

(65) Prior Publication Data

US 2016/0171665 A1    Jun. 16, 2016

Related U.S. Application Data

(63) Continuation of application No. 14/534,627, filed on Nov. 6, 2014, now Pat. No. 9,251,570.

(51) Int. Cl.
*G06T 5/00* (2006.01)
*G06T 19/20* (2011.01)

(52) U.S. Cl.
CPC .............. *G06T 5/002* (2013.01); *G06T 19/20* (2013.01); *G06T 2200/04* (2013.01); *G06T 2207/20192* (2013.01); *G06T 2207/30201* (2013.01)

(58) Field of Classification Search
USPC ........................................ 382/254, 264, 274
See application file for complete search history.

(56) References Cited

U.S. PATENT DOCUMENTS

| | | | | |
|---|---|---|---|---|
| 6,987,511 B2* | 1/2006 | Taubin | .................... | G06T 17/20 345/420 |
| 8,472,700 B2* | 6/2013 | Kim | ........................ | G06T 13/40 345/419 |
| 2005/0147280 A1* | 7/2005 | Yan | ..................... | G06K 9/00288 382/118 |
| 2006/0285769 A1* | 12/2006 | Wang | ................. | G06K 9/00241 382/274 |
| 2007/0189627 A1* | 8/2007 | Cohen | ................ | G06K 9/00228 382/254 |
| 2007/0258656 A1* | 11/2007 | Aarabi | ............... | G06K 9/00228 382/254 |
| 2008/0181507 A1* | 7/2008 | Gope | ..................... | H04N 5/144 382/190 |
| 2008/0212894 A1* | 9/2008 | Demirli | .................. | A61B 5/441 382/276 |
| 2009/0153553 A1* | 6/2009 | Kim | ........................ | G06T 17/20 345/419 |
| 2014/0010448 A1* | 1/2014 | Lischinski | .............. | G06T 5/005 382/167 |
| 2015/0221131 A1* | 8/2015 | Luo | ........................ | G06T 17/20 345/419 |

* cited by examiner

*Primary Examiner* — Ishrat I Sherali
(74) *Attorney, Agent, or Firm* — Van Pelt, Yi & James LLP

(57) ABSTRACT

Smart image enhancements are disclosed, including: obtaining a representation of a user's face associated with a set of images associated with the user's face; obtaining a set of extrinsic information corresponding to an image of the set of images; determining a modified smoothing map by modifying a model smoothing map to correspond to the representation of the user's face; and determining an enhanced image based at least in part on the set of extrinsic information corresponding to the image, the modified model smoothing map, and the image.

23 Claims, 15 Drawing Sheets

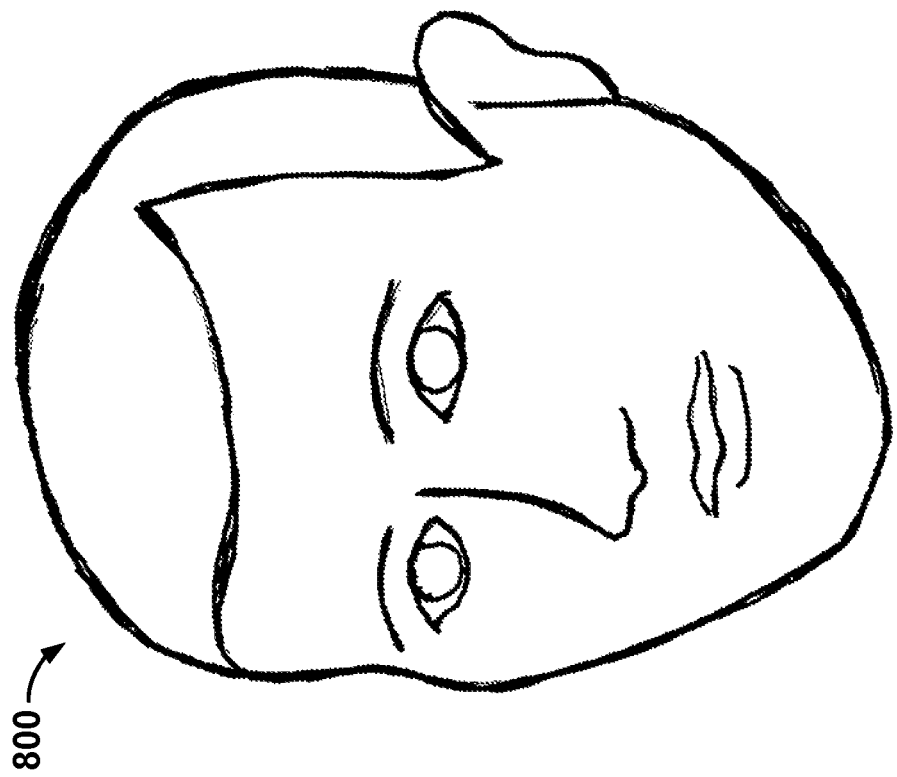
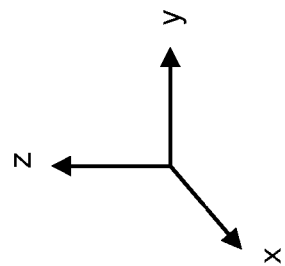
FIG. 8

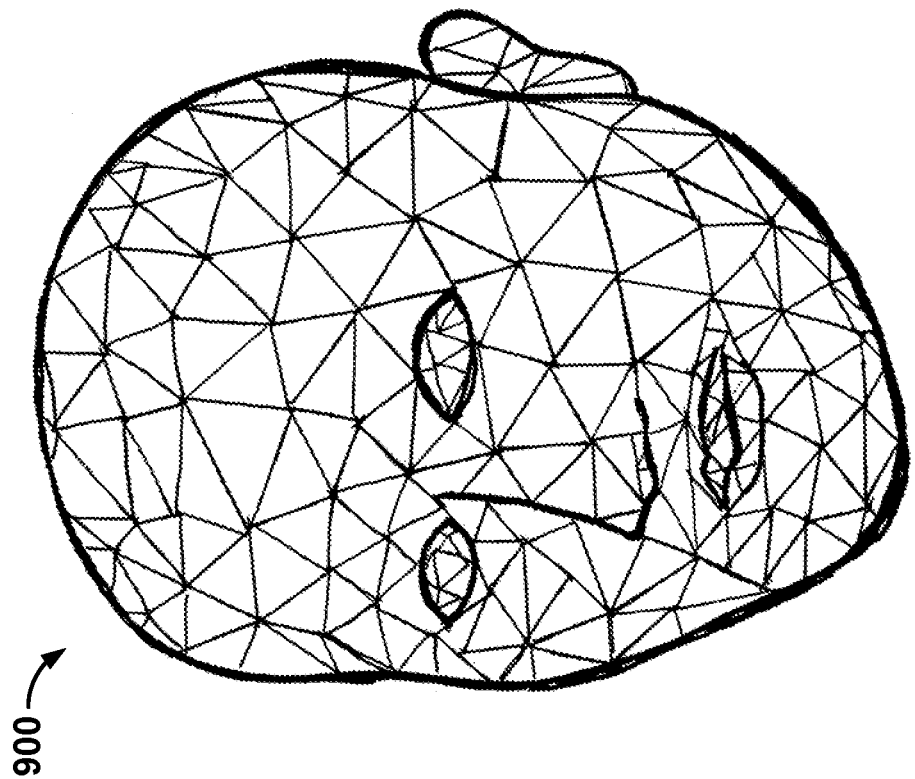
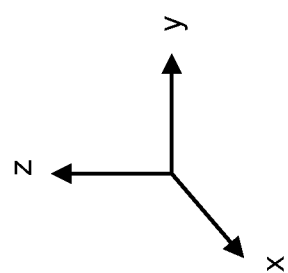
FIG. 9

| | | | | |
|---|---|---|---|---|
| .00 | .01 | .02 | .03 | .00 |
| .01 | .06 | .1 | .06 | .01 |
| .03 | .1 | .15 | .1 | .03 |
| .01 | .06 | .1 | .06 | .01 |
| .00 | .01 | .03 | .01 | .00 |

Kernel size = 5 x 5 pixels

FIG. 14B

| | | |
|---|---|---|
| .06 | .13 | .06 |
| .13 | .25 | .13 |
| .06 | .13 | .06 |

Kernel size = 3 x 3 pixels

FIG. 14A

SMART IMAGE ENHANCEMENTS

CROSS REFERENCE TO OTHER APPLICATIONS

This application is a continuation of co-pending U.S. patent application Ser. No. 14/534,627, entitled SMART IMAGE ENHANCEMENTS filed Nov. 6, 2014 which is incorporated herein by reference for all purposes.

BACKGROUND OF THE INVENTION

Typical filters apply uniformly to an entire image. As such, typical filters are not effective in differentiating between features of an image that should remain sharp and features of the image that should be altered. For example, in applying a filter to an image of a person's face, it may not be desirable to apply the filter to certain facial features, such as the eyes and lips.

BRIEF DESCRIPTION OF THE DRAWINGS

Various embodiments of the invention are disclosed in the following detailed description and the accompanying drawings.

FIG. 8 is a diagram showing an example of a visualization of a 3D model of a user's face in 3D space.

FIG. 9 is a diagram showing an example of a visualization of a morphed 3D smoothing map in 3D space.

FIGS. 14A and 14B each show an example Gaussian kernel of a particular size.

DETAILED DESCRIPTION

Figure 1:
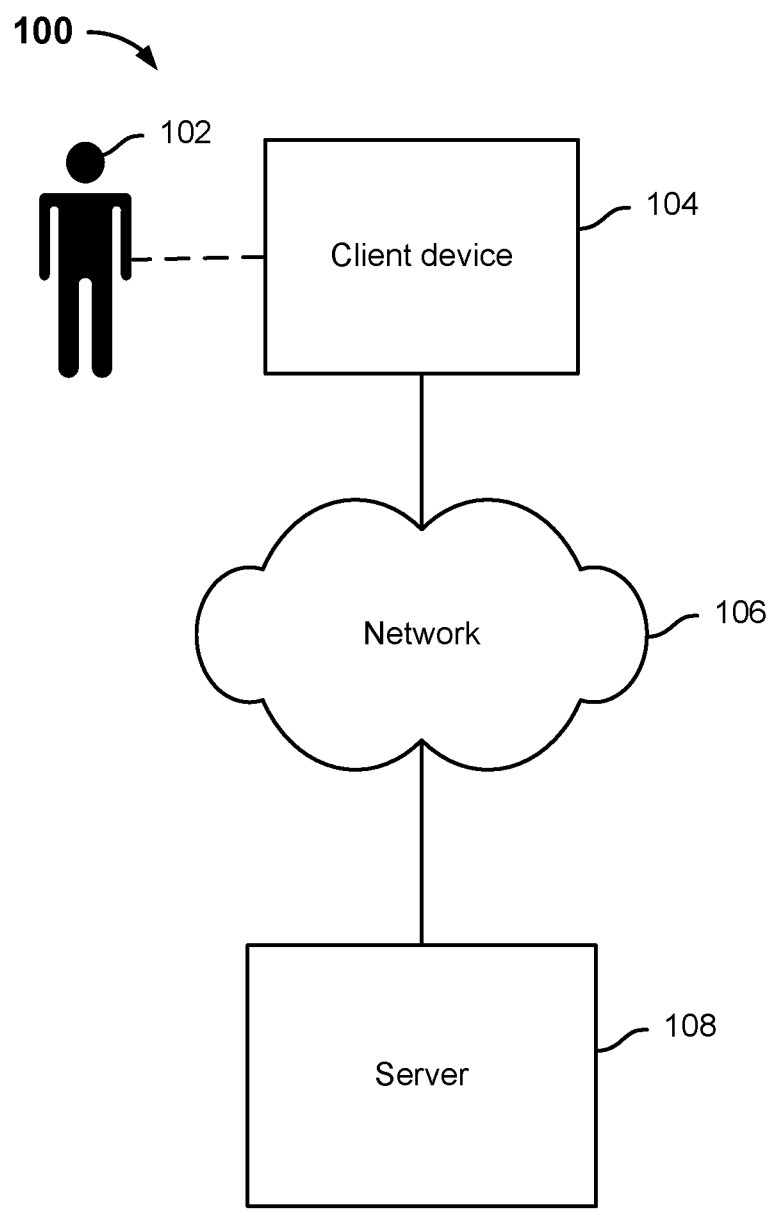
FIG. 1 is a diagram showing an embodiment of a system for performing smart image enhancements.

The invention is implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of performing smart facial feature enhancements are described herein. In various embodiments, a three-dimensional (3D) representation (e.g., model) of a user's face is determined from a set of images of the user's face at various orientations. For example, the set of images may include frames of a video recording of the user moving his or her head from side to side. In various embodiments, a set of extrinsic information is determined for each image of the set of images. In some embodiments, the set of extrinsic information corresponding to an image describes an orientation associated with the user's face in that image. A 3D smoothing map is obtained. In various embodiments, the 3D smoothing map describes various polygons (e.g., a polygon is a surface that includes three or more vertices) that cover a generic face in 3D space and also a smoothing degree associated with each polygon. The smoothing degree associated with each polygon of the 3D generic face describes the degree to which an original image of the user's face corresponding to that polygon should be smoothed in the enhanced version of that image. For example, the smoothing degree associated with each polygon of the 3D smoothing map is a value on the scale 0 to 1 and is configured by an administrator. For example, a smoothing degree of 0 represents no smoothing and a smoothing degree of 1 represents maximum smoothing. The smoothing degree of each polygon of the 3D smoothing map may also be represented in greyscale, where the closer the smoothing degree of the polygon is to 0, the darker the polygon will be and the closer the smoothing degree of the polygon is to 1, the lighter the polygon will be. For example, a polygon that is assigned a smoothing degree of 0 is black and a polygon that is assigned a smoothing degree of 1 is white. In some embodiments, the smoothing degree associated with a polygon of the 3D generic face that is associated with a facial feature that should be relatively less affected by a smoothing filter, such as the eyes or lips, can be assigned a lower value (e.g., a value closer to 0). Similarly, the smoothing degree associated with a polygon of the 3D generic face that is associated with a facial feature that should be relatively more affected by a smoothing filter, such as the polygons of the skin that are commonly associated with wrinkles, can be assigned a higher value (e.g., a value closer to 1).

Because the 3D smoothing map was predetermined for a generic face, in various embodiments, to customize the 3D smoothing map to the user's face associated with the images, the 3D smoothing map can be morphed to match the 3D model of the user's face associated with the set of images. For example, morphing the 3D smoothing map to correspond to the user's face can include moving the vertices of the polygons described by the 3D smoothing map to corresponding locations on the 3D model of the user's face. In some embodiments, for each image of the set, the morphed 3D smoothing map can be used with the set of extrinsic information associated with that image to generate a two-dimensional (2D) smoothing mask corresponding to that image. The 2D smoothing mask corresponding to an image comprises a 2D projection of the morphed 3D smoothing map that matches the orientation of the user's face in that image. In various embodiments, each image is smoothed using a smoothing filter and then the smoothed image is modified by the 2D smoothing mask corresponding to that image. In various embodiments, the modified smoothed image is combined with the original image to generate the enhanced version of that image. The enhanced version of an image of the user's face should include more smoothing to the polygons of the user's face that correspond to higher smoothing degrees (e.g., polygons of the skin that are commonly associated with wrinkles) and little to no smoothing to polygons of the user's face that correspond to lower smoothing degrees (e.g., eyes, nose, lips, etc.). As such, embodiments described herein use a smoothing filter to reduce the appearance of wrinkles or other undesirable facial blemishes in the enhanced image and also use 3D smoothing map to preserve the sharpness in the user's other facial features such as the eyes, nose, and lips, for example, in the enhanced image. In some embodiments, multiple enhanced images can be played back at a display interface for the user.

In some embodiments, the application of a smoothing filter can be customized for each image of the set of images. In some embodiments, an edge score is determined for each image after it has been modified by a 2D wrinkle mask corresponding to that image. The edge score can be determined by applying an edge detection process to that image, for example. The more edges, which are presumed to be wrinkles and/or other undesirable facial features, that are detected in that image, the greater the edge score is determined to be for that image. The degree of smoothness (e.g., blurring) that is applied to that entire image can be adjusted based on the corresponding edge score. As such, the edge score determined for an image can be used to customize the degree of smoothing that will be applied to that image.

FIG. 1 is a diagram showing an embodiment of a system for performing smart image enhancements. In the example, system 100 includes client device 104, network 106, and server 108. Network 106 includes high speed data networks and/or telecommunications networks. In some embodiments, client device 104 is configured to communicate to server 108 over network 106.

Client device 104 is configured to record or receive a set of recorded images corresponding to a user's head at various orientations. Examples of client device 104 may include a laptop computer, a desktop computer, a tablet device, a mobile device, a smart phone and/or any computing device. For example, the set of recorded images may comprise a video or a series of snapshots. In some embodiments, client device 104 includes or is connected to a camera device. The camera device and/or a processor of client device 104 that is running an application can capture a set of images of the user's head as user 102 turns his or her head in different directions (e.g., as instructed through a user interface of the application). In various embodiments, the set of images is sent to server 108 for server 108 to process. In some embodiments, client device 104 includes a user interface through which the user may interact and view a playback associated with the images.

In various embodiments, server 108 is configured to receive a set of images sent from a client device such as client device 104. Server 108 searches for a (e.g., optimal) representation (e.g., a mathematical 3D model) of the user's (e.g., user 102) face associated with a set of images and also (e.g., optimal) sets of extrinsic information corresponding to respective images of the set (e.g., a set of extrinsic information is specifically determined for each image of the set).

Server 108 is configured to obtain a 3D model of the user 102's face from the set of images. Furthermore, server 108 is configured to obtain a set of extrinsic information associated with each image of at least a subset of the set of images. Server 108 is configured to receive a 3D smoothing map that describes a smoothing degree corresponding to each of various polygons on a 3D generic face. In some embodiments, each polygon of the 3D generic face is defined by three or more vertices associated with respective three or more coordinates in 3D space. In some embodiments, the smoothing degree of a polygon corresponds to a value of 0 to 1 and describes the degree to which an original image of the user's face corresponding to that polygon should be smoothed in the enhanced version of that image. The 3D smoothing map may be configured by an administrator. In some embodiments, polygons of the 3D smoothing map that correspond to a facial feature that is selected to be preserved and therefore less affected by a smoothing filter (e.g., eyes, nose, lips) are associated with lower smoothing degrees and polygons of the 3D smoothing map that correspond to a facial feature that is selected to be more affected by a filter (e.g., polygons of skin that are commonly associated with wrinkles and/or other undesirable qualities) are associated with higher smoothing degrees.

In various embodiments, server 108 is configured to morph the 3D smoothing map to match the 3D model of the user 102's face. For example, in the morphed 3D smoothing map, the vertices of the polygons have been moved to locations in 3D space onto the 3D model of user 102's face. Server 108 is configured to use the set of extrinsic information corresponding to each image to orient the morphed 3D smoothing map to correspond to the orientation of the user's face in that image. Then, server 108 is configured to project the oriented morphed 3D smoothing map onto a 2D surface of the focal plane of a camera using a set of intrinsic information associated with the camera to obtain a 2D smoothing mask corresponding to that image. As such, a corresponding 2D smoothing mask can be generated for each image. A 2D smoothing mask corresponding to an image includes the polygons of the smoothing map that correspond to the user's face at the orientation associated with that image and each polygon includes a greyscale shading determined based on a corresponding smoothing degree (e.g., the smoothing degree can be a value from 0 to 1).

In various embodiments, server 108 is configured to apply a smoothing process (e.g., applying a Gaussian kernel) to each image and then modify the smoothed image with the corresponding 2D smoothing mask. In some embodiments, each modified smoothed image is then combined with its corresponding original image to generate the enhanced version of that image, in which the polygons associated with lower smoothing degrees are relatively unchanged from the original image and in which polygons associated with higher smoothing degrees appear smoother than the original image. For example, if the 3D smoothing map had assigned lower smoothing degrees to polygons associated with the eyes, nose, and lips but had assigned higher smoothing degrees to polygons of skin (particularly, those polygons that are commonly associated with wrinkles and/or other blemishes) on the face, then an enhanced image would include smoother appearing skin on user 102's face but preserve the details of user 102's face from the original image. As such, an enhanced image improves the appearance of certain polygons of user 102's face that were selected to be more heavily filtered, as will be described in further detail below. In some embodiments, server 108 is configured to adjust the application of the smoothing filter to an image based at least in part on one or more edges that are determined from that image, as will be described in further detail below.

In some embodiments, enhancing the recorded set of images as described above may also be performed, at least in part, locally at client device 104. For example, server 108 can send computer code to client device 104 that client device 104 can use to perform at least a portion of the enhancing as described herein.

Figure 2:
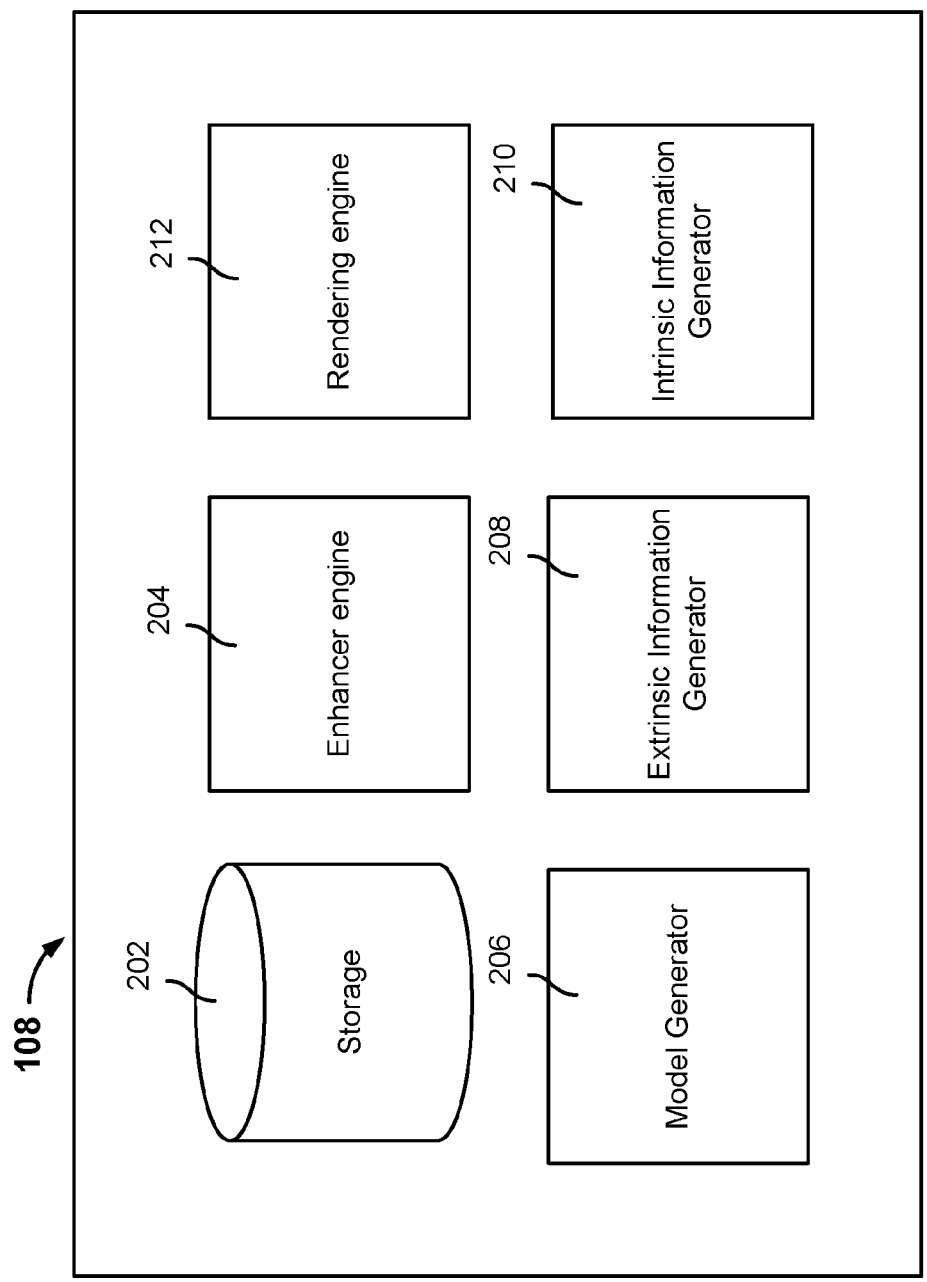
FIG. 2 is a diagram showing an embodiment of a server.

FIG. 2 is a diagram showing an embodiment of a server. In some embodiments, server 108 of system 100 of FIG. 1 is implemented using the example of FIG. 2. In the example, the server includes storage 202, enhancer engine 204, model generator 206, extrinsic information generator 208, intrinsic information generator 210, and rendering engine 212. The server may be implemented with additional, different, and/or fewer components than those shown in the example. Each of enhancer engine 204, model generator 206, extrinsic information generator 208, intrinsic information generator 210, and rendering engine 212 may be implemented using hardware and/or software.

Storage 202 is configured to store data. In some embodiments, storage 202 stores one or more sets of images and any associated data. For example, each set of images is associated with a video or a series of snapshots of various orientations of a user's face. In some embodiments, storage 202 stores one or more 3D smoothing maps. In some embodiments, each 3D smoothing map includes the coordinates associated with each polygon of a 3D generic face and also a corresponding smoothing degree associated with each polygon. For example, a 3D smoothing map may be configured by an administrator assigning a smoothing degree (from 0 to 1) to each predetermined polygon of a 3D generic face based on whether the polygon corresponds to a facial feature that is desired to be heavily altered by a smoothing process, in which a higher smoothing degree is assigned, or a facial feature that is desired to be lightly altered or left unaltered by a smoothing process, in which a lower smoothing degree is assigned. In some embodiments, polygons of the face that are commonly associated with wrinkles and/or other undesirable qualities (e.g., eye corners, mouth corners, forehead) are assigned relatively higher smoothing degrees and polygons of the face that are not commonly associated with wrinkles and/or other undesirable qualities (e.g., eyes, nose, lips, eyebrows) are assigned relatively lower smoothing degrees. In some embodiments, a 3D smoothing map comprises a greyscale map, in which a polygon with a higher smoothing degree is colored in with a lighter shade and a polygon with a lower smoothing degree is colored in with a darker shade. In some embodiments, storage 202 stores smoothed images (images that have already been smoothed by a smoothing process). In some embodiments, storage 202 stores enhanced images (e.g., that are generated from a combination of an original image and its corresponding smoothed image).

Model generator 206 is configured to determine a mathematical 3D model for a user's face associated with each set of images. For example, the mathematical 3D model of the user's face (i.e., the mathematical model of the user's face in 3D space) may be set at the origin. In some embodiments, the mathematical 3D model determined for a user's face is referred to as an M matrix. In some embodiments, the M matrix may be determined based on a set of reference points associated with features on the user's face from the associated set of images. Examples of reference points include endpoints of the user's eye, bridge of the user's nose, and tip of the user's nose. In some embodiments, model generator 206 is configured to store the M matrix determined for a set of images with the set at storage 202.

Extrinsic information generator 208 is configured to determine a set of extrinsic information for each of at least a subset of a set of images. For example, the set of images may be stored at storage 202. In various embodiments, a set of extrinsic information corresponding to an image of a set of images describes one of more of the orientation, rotation, and translation of the 3D model of the user's face needed to result in the correct appearance of the user's face in that particular image. In some embodiments, the set of extrinsic information determined for an image of a set of images associated with a user's face is referred to as an (R, t) pair where R is a rotation matrix and t is a translation vector corresponding to that image. In some embodiments, extrinsic information generator 208 is configured to store the (R, t) pair determined for each of at least a subset of a set of images with the set at storage 202.

Intrinsic information generator 210 is configured to generate a set of intrinsic information for a camera associated with recording a set of images. For example, the camera was used to record a set of images stored at storage 202. In various embodiments, a set of intrinsic information corresponding to a camera describes a set of parameters associated with the camera. For example, a parameter associated with a camera comprises a focal length and a principal point of the camera sensor. In some embodiments, the set of intrinsic information associated with a camera is found by taking multiple pictures under various angles of an object with known points and solving an optimization problem treating camera intrinsics and extrinsics as variables, and the model as a constant. In some embodiments, the set of intrinsic information associated with a camera is referred to as an I matrix. In some embodiments, for many practical uses, including performing the smart enhancements of images made on laptops or mobile phones, the intrinsic information determined for the camera can be assumed to be the same across all devices. In some embodiments, intrinsic information generator 210 is configured to store an I matrix determined for the camera associated with a set of images with the set at storage 202.

Enhancer engine 204 is configured to morph a 3D smoothing map associated with a 3D generic face to match a 3D model of a user's face determined from a set of images. In some embodiments, the modified 3D smoothing map corresponding to the user's face is referred to as the M' matrix. In some embodiments, the enhancer engine 204 morphs the 3D smoothing map by moving the vertices associated with each polygon of the 3D generic face to corresponding locations on the 3D model of the user's face.

For each image of at least a subset of a set of images (e.g., stored at storage 202), enhancer engine 204 is configured to use the I matrix (intrinsic information) to project a modified 3D smoothing map transformed by an (R, t) pair (extrinsic information) corresponding to a particular image onto the 2D surface of the focal plane of the camera to obtain the 2D smoothing mask corresponding to that image. In other words, I×(R×M'+t) results in the projection of the modified 3D smoothing map, the M' matrix, in the orientation and translation transformed by the (R, t) pair corresponding to an image, onto a 2D surface. The projection onto the 2D surface is the view of the modified 3D smoothing map as seen from the camera. In some embodiments, the 2D smoothing mask corresponding to image N of a set of images is referred to as $\alpha_N$. In some embodiments, a 2D smoothing mask comprises a greyscale mask/image, in which a polygon with a higher smoothing degree value (corresponding to a value closer to 1) is colored in with a lighter shade and a polygon with a higher smoothing degree (corresponding to a value close to 0) is colored in with a darker shade. For example, when a 2D smoothing mask is produced from the 3D smoothing map and a set of extrinsic information, the 2D smoothing mask is rendered on a black image, and as such, the areas of the image in which the mask is not present will remain black (e.g., associated with the smoothing degrees of 0) so that the pixels outside of the user's face will not be altered by the smoothing process. In some embodiments, the 2D smoothing mask comprises an image file (e.g., a .png, a .jpeg, etc.). In some embodiments, the 2D smoothing mask comprises a matrix with greyscale pixel values corresponding to the pixels of the 2D smoothing mask. For example, if the 2D smoothing mask comprises an image file, each pixel of the image would be in the range of 0 to 255 and therefore, each pixel value of the 2D smoothing mask image file would need to be scaled down to a value from 0 to 1 prior to being applied as a mask to an image. Enhancer engine 204 is configured to apply a smoothing process to each image of the at least subset of the set of images. Enhancer engine 204 is configured to modify/apply each original image using the corresponding inverted 2D smoothing mask (e.g., $(1-\alpha_N)$) represents the inverted 2D smoothing mask for image N of the set of images). For example, modifying each original image using the corresponding inverted 2D smoothing mask $(1-\alpha_N)$ includes multiplying each channel (e.g., Red, Green, and Blue) value of each pixel of the smoothed image with the greyscale value from the corresponding pixel of the inverted 2D smoothing mask. Enhancer engine 204 is configured to modify each smoothed image of the set of images using the corresponding 2D smoothing mask (e.g., $\alpha_N$ represents the 2D smoothing mask for image N of the set of images). For example, modifying each smoothed image using the corresponding 2D smoothing mask $(\alpha_N)$ includes multiplying each channel (e.g., Red, Green, and Blue) value of each pixel of the smoothed image with the greyscale value from the corresponding pixel of the 2D smoothing mask. Then, enhancer engine 204 is configured to combine each modified original image with its corresponding modified smoothed image to generate the enhanced image corresponding to that original image. In some embodiments, enhancer engine 204 is configured to store the enhanced versions of a set of images at storage 202.

Rendering engine 212 is configured to display at least some enhanced images at a user interface. In some embodiments, rendering engine 212 is configured to display a selected item (e.g., glasses frames, jewelry) overlaid at least some of the enhanced images to provide the user not only playback of an enhanced version of the images recorded of that user's face but also the experience of virtually trying on the selected item.

Figure 3:
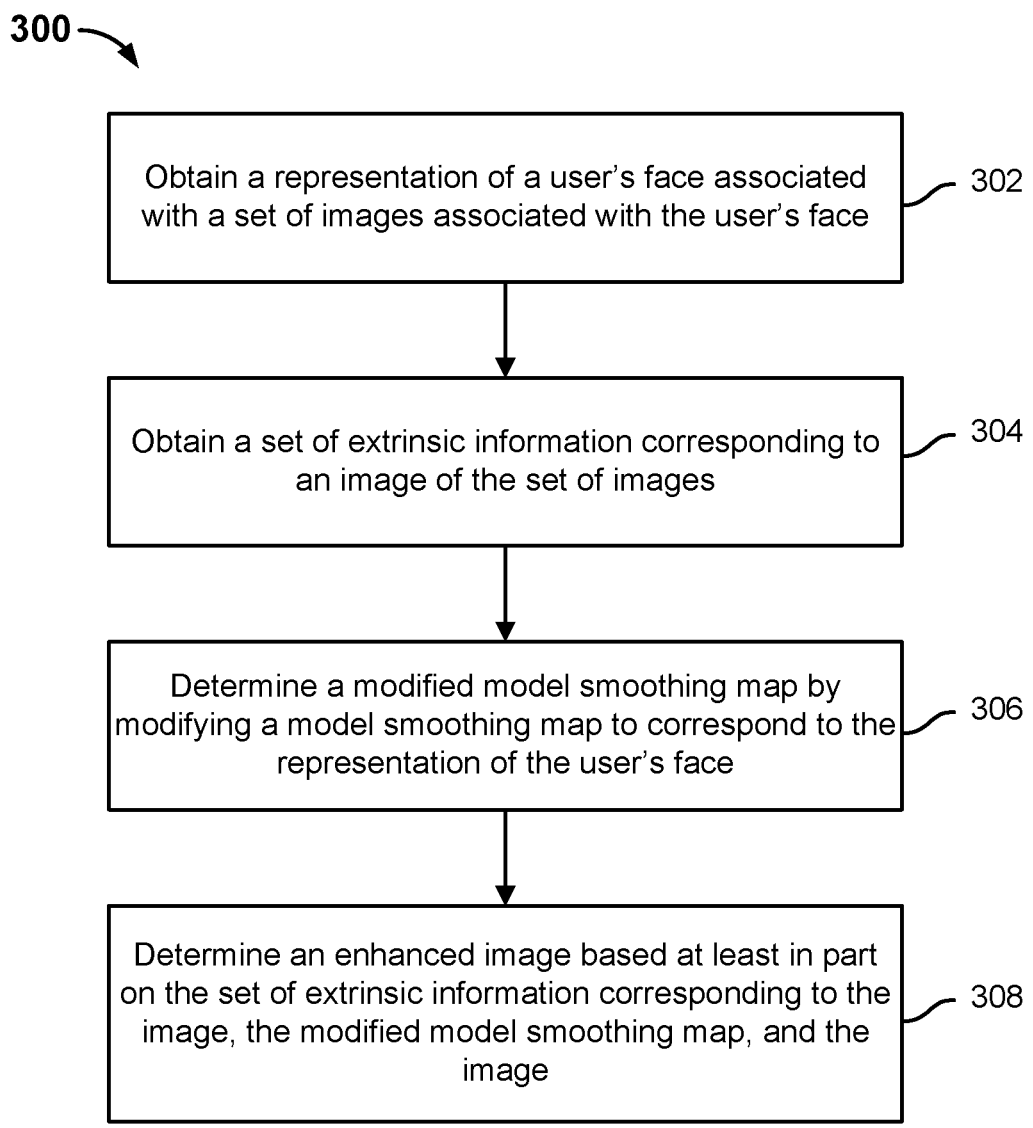
FIG. 3 is a flow diagram showing an embodiment of a process for performing smart image enhancements.

FIG. 3 is a flow diagram showing an embodiment of a process for performing smart image enhancements. In some embodiments, process 300 is implemented at system 100 of FIG. 1.

At 302, a representation of a user's face associated with a set of images associated with the user's face is obtained. In some embodiments, the representation of a user's face comprises a 3D mathematical model of the user's face. At 304, a set of extrinsic information corresponding to an image of the set of images is obtained. In some embodiments, the set of extrinsic information corresponding to an image describes an orientation associated with the user's face in that image. At 306, a modified model smoothing map is determined by modifying a model smoothing map to correspond to the representation of the user's face. In various embodiments, a model smoothing map comprises a 3D smoothing map associated with a 3D generic face. In some embodiments, polygons of the 3D smoothing map that correspond to a facial feature that is selected to be preserved and therefore less affected by a filter (e.g., eyes, nose, lips) are associated with lower smoothing degrees and polygons of the 3D smoothing map that correspond to a facial feature that is selected to be more affected by a filter (e.g., polygons of skin that are commonly associated with wrinkles and/or other undesirable qualities) are associated with higher smoothing degrees. In some embodiments, the 3D smoothing map associated with a 3D generic face is morphed to match the 3D model associated with the user's face. In some embodiments, the 3D smoothing map is morphed by moving the vertices associated with each polygon of the 3D generic face to corresponding locations on the 3D model of the user's face. The following is one example technique by which to morph the 3D smoothing map to correspond to the representation of the user's face: Define a set of reference points on a face. Examples of reference points may be related to facial features such as eye corners, a nose tip, cheekbones, and mouth corners. The 3D coordinate of each such reference point is located on the representation (e.g., 3D model) of the user's face and also on the 3D smoothing map. The 3D smoothing map is morphed to correspond to the 3D model of the user's face by moving the each reference point located on the 3D smoothing map to match the 3D coordinate of the corresponding reference point located on the 3D model of the user's face. As each reference point located on the 3D smoothing map is moved to match the 3D coordinate of the corresponding reference point located on the 3D model of the user's face, the vertices of the polygons of the 3D smoothing map are pulled along with the movement. At 308, an enhanced image is determined based at least in part on the set of extrinsic information corresponding to the image, the modified model smoothing map, and the image. In various embodiments, an enhanced version of the image is determined using the set of extrinsic information corresponding to the image, the modified model smoothing map, and the image itself.

Figure 4:
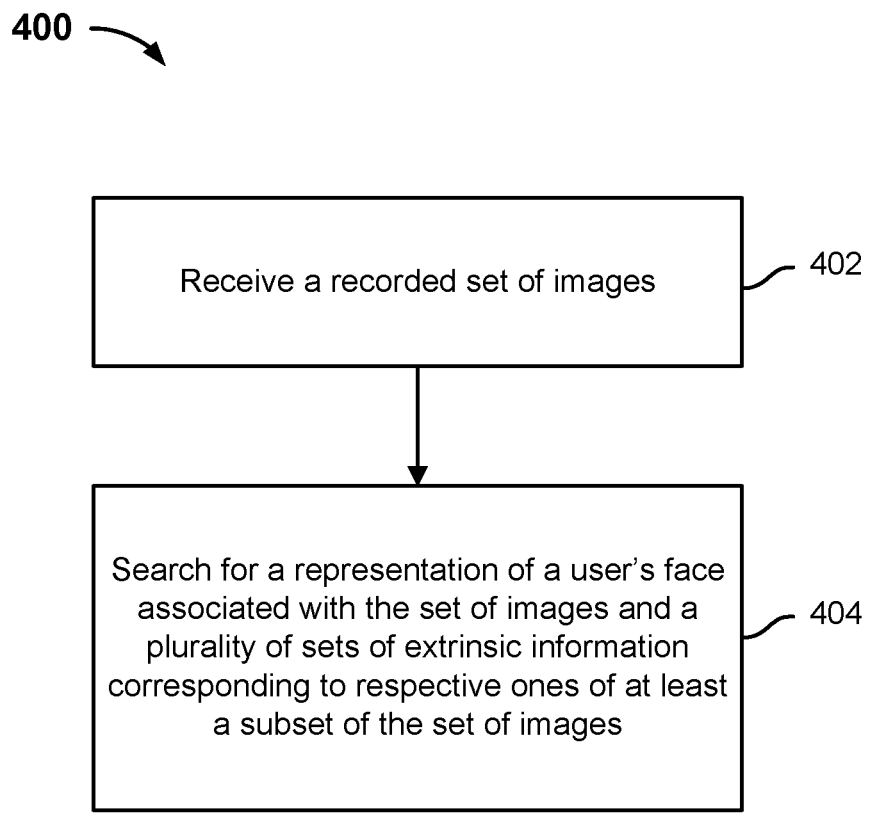
FIG. 4 is a flow diagram showing an example of a process for processing a set of images.

FIG. 4 is a flow diagram showing an example of a process for processing a set of images. In some embodiments, process 400 is implemented at system 100 of FIG. 1. In some embodiments, 302 and 304 of process 300 of FIG. 3 are implemented at least in part using process 400.

At 402, a recorded set of images is received. In various embodiments, the set of images corresponds to a recorded video or a series of snapshots of a user's face turned in different orientations. As such, each image of the set is associated with an orientation of the user's face in that image.

At 404, a representation of a user's face associated with the set of images and a plurality of sets of extrinsic information corresponding to respective ones of at least a subset of the set of images are searched for. In some embodiments, the representation of the user's face is a model in 3D space and is referred to as an M matrix. In some embodiments, the M matrix is determined based at least in part on measured reference points of one or more features associated with the user's face. In some embodiments, the extrinsic set of information associated with an image of the set of images is referred to as an (R, t) pair. An (R, t) pair is determined for each of at least a subset of the set of images so each image corresponds to a respective (R, t) pair that is associated with the orientation of the user's face in that image.

In some embodiments, an optimal M matrix is determined for the set of images and an optimal (R, t) pair is determined for each of at least a subset of the set of images. In a first example, a parameter search is used to perform iterative computations until the optimal M and set of (R, t) pairs are found. For example, a distribution of M matrices (e.g., that have been predetermined based on known face samples or generated on the fly) corresponding to the set of images and a distribution of (R, t) pairs corresponding to each image of the set of images are determined, and a combination of matrix M and (R, t) pairs that best describes at least a subset of the set of images is selected. In another example, a bundle adjust technique is used and the bundle adjust technique may treat the M and the set of (R, t) pairs as unknowns in an optimization problem and iteratively test out various combinations of M matrices and (R, t) pairs until an M and a set of (R, t) pairs are found that best match the set of images. For example, the optimal M matrix and an optimal (R, t) pair corresponding to an image result in the minimum reprojection error of any other combination of an M matrix and an (R, t) pair and therefore the combination of this M matrix and this (R, t) pair best matches the image corresponding to the (R, t) pair. While one M matrix is determined for the set of images, a set of (R, t) pairs, each corresponding to respective ones of at least a subset of the set of images, is determined.

Figure 5:
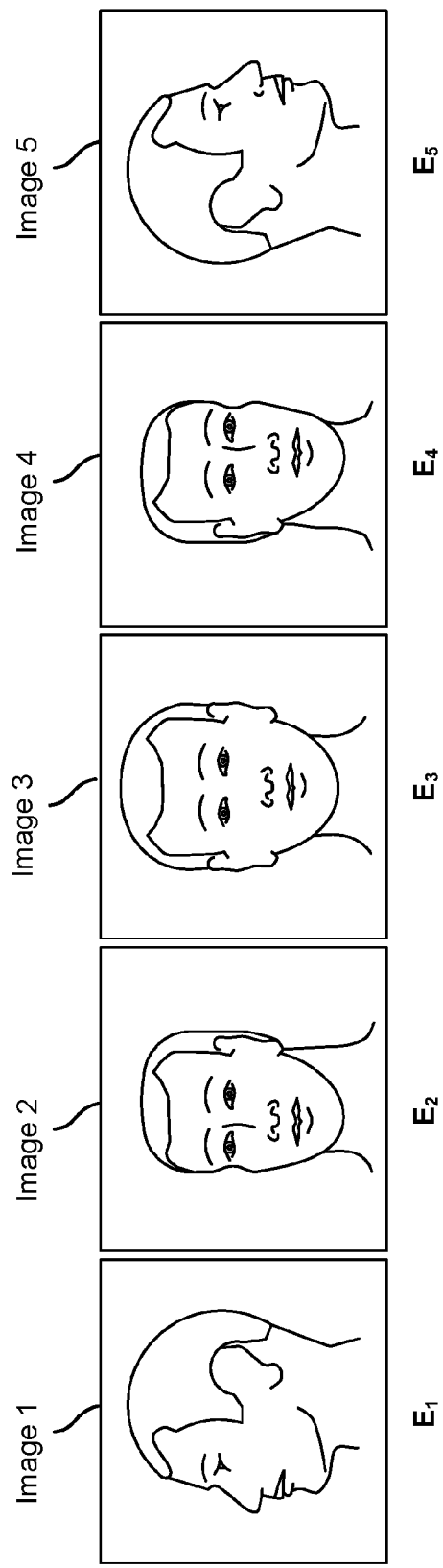
FIG. 5 is a diagram showing several images included in a set of images.

FIG. 5 is a diagram showing several images included in a set of images. In the example, Images 1, 2, 3, 4, and 5 are included in a recorded set of images of a user's face at various different orientations relative to the camera. As described above, a set of extrinsic information, E, (e.g., an (R, t) pair) that describes the orientation and translation of the user's face in an individual image is determined for that image. As shown in the example, each image is identified by a number 1 through 5 and has a corresponding set of extrinsic information, E, which includes the number associated with the image as its subscript (e.g., $E_1$ corresponds to Image 1, $E_2$ pair corresponds to Image 2, etc.). For example, $E_1$ may be used to transform a 3D smoothing map that has been morphed to match a 3D model of the user's face in the set of images, the M matrix, in 3D space into the orientation and translation of the user's face that is shown in Image 1.

Figure 6:
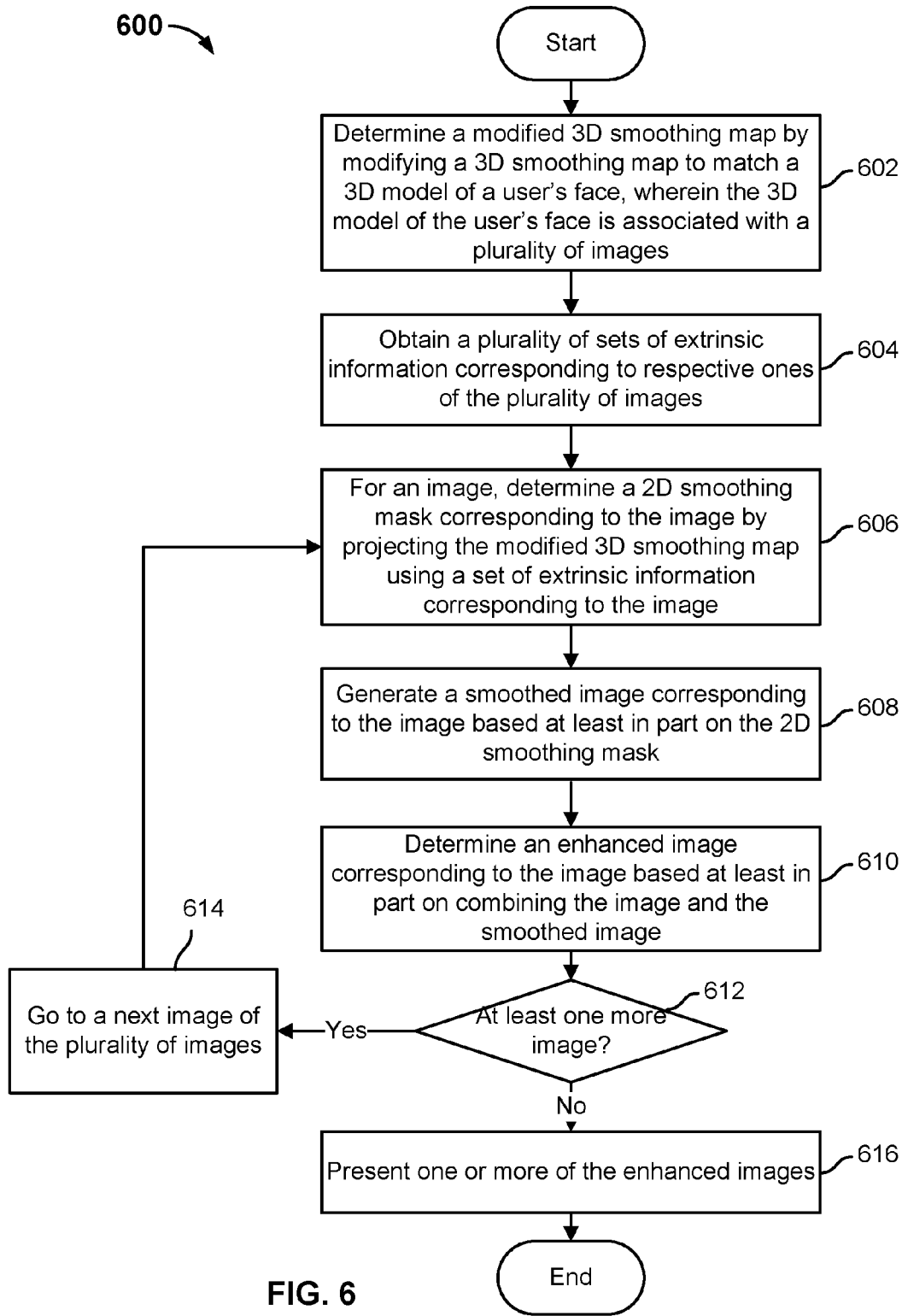
FIG. 6 is a flow diagram showing an example of a process for performing smart image enhancements.

FIG. 6 is a flow diagram showing an example of a process for performing smart image enhancements. In some embodiments, 306 and 308 of process 300 of FIG. 3 are implemented at least in part using process 600.

At 602, a modified 3D smoothing map is determined by modifying a 3D smoothing map to match a 3D model of a user's face, wherein the 3D model of the user's face is associated with a plurality of images. In some embodiments, a 3D smoothing map comprises coordinates for the vertices of each polygon of a 3D generic face and a smoothing degree that was assigned to each such polygon. In some embodiments, modifying the 3D smoothing map includes morphing the 3D smoothing map to change its shape to correspond to the shape of the 3D model of the user's face. For example, the 3D smoothing map is morphed to match a 3D model of a user's face (e.g., that was determined using a process such as process 400 of FIG. 4) by at least moving the coordinates for the vertices of each polygon of the 3D generic face to corresponding locations on the 3D model of the user's face.

At 604, a plurality of sets of extrinsic information corresponding to respective ones of the plurality of images is obtained. A set of extrinsic information is determined corresponding to each image of the plurality of images (e.g., using a process such as process 400 of FIG. 4).

At 606, for an image, a 2D smoothing mask corresponding to the image is determined by projecting the modified 3D smoothing map using a set of extrinsic information corresponding to the image. In some embodiments, the morphed 3D smoothing map is projected onto a 2D surface using at least the set of extrinsic information corresponding to an image of the plurality of images to generate a 2D smoothing mask corresponding to the image. For example, the 2D smoothing mask comprises a 2D projection of the morphed 3D smoothing map that corresponds to the orientation of the user's face in that image. The 2D smoothing mask comprises the polygons of the modified 3D smoothing map that can be viewed at the orientation of the user's face in that image. In some embodiments, a 2D smoothing mask comprises a greyscale mask/image, in which a polygon with a higher smoothing degree value (corresponding to a value closer to 1) is colored in with a lighter shade and a polygon with a lower smoothing degree value (corresponding to a value close to 0) is colored in with a darker shade. In some embodiments, for image N of a set of images, the 2D smoothing mask determined for image N may be referred to as $\alpha_N$.

At 608, a smoothed image corresponding to the image is generated based at least in part on the 2D smoothing mask. In some embodiments, a smoothing process is applied to the image to generate a smoothed version of that image. In some embodiments, the smoothing process includes determining a new pixel value for each pixel of the image based on averaging the pixel values of a neighborhood of pixels relative to that pixel. In some embodiments, the smoothing process includes applying a Gaussian kernel across the image. In some embodiments, the smoothed image is then modified using the 2D smoothing mask. In some embodiments, smoothing of an image or at least a portion of the image is adjusted based at least in part on edge detection results associated with that image or that portion of that image, as will be described in further detail below.

At 610, an enhanced image corresponding to the image is determined based at least in part on combining the image and the smoothed image. In some embodiments, the original image is first modified using the inverted 2D smoothing mask prior to being combined with the (modified) smoothed image to generate the enhanced image. For example, if the 3D smoothing map had assigned lower smoothing degrees to polygons associated with the eyes, nose, and lips but had assigned higher smoothing degrees to polygons of the skin (particularly, those polygons that are commonly associated with wrinkles and/or other blemishes), then an enhanced image would include smoother appearing skin (e.g., skin with less visible wrinkles and/or other blemishes) on the user's face but preserve the other details of the user's face from the original image.

At 612, it is determined whether there is at least one more image of the plurality of images. In the event that there is at least one more image, control is transferred to 614, at which the next image in the plurality of images is processed starting at 606. Otherwise, in the event that there are no more images, control is transferred to 616. 606, 608, and 610 are applied to each image of the plurality of images to generate a corresponding enhanced image.

At 616, one or more enhanced images are presented. In some embodiments, at least some of the enhanced images generated corresponding to images of the plurality of images are displayed at a user interface. In some embodiments, a user input (e.g., a user's movement using a cursor at the user interface) is received and the presentation of the enhanced images can be adjusted based on the user input. For example, if the user moved the cursor to the left, then sequential enhanced images associated with the user turning his or her face to a side can be displayed.

Figure 7:
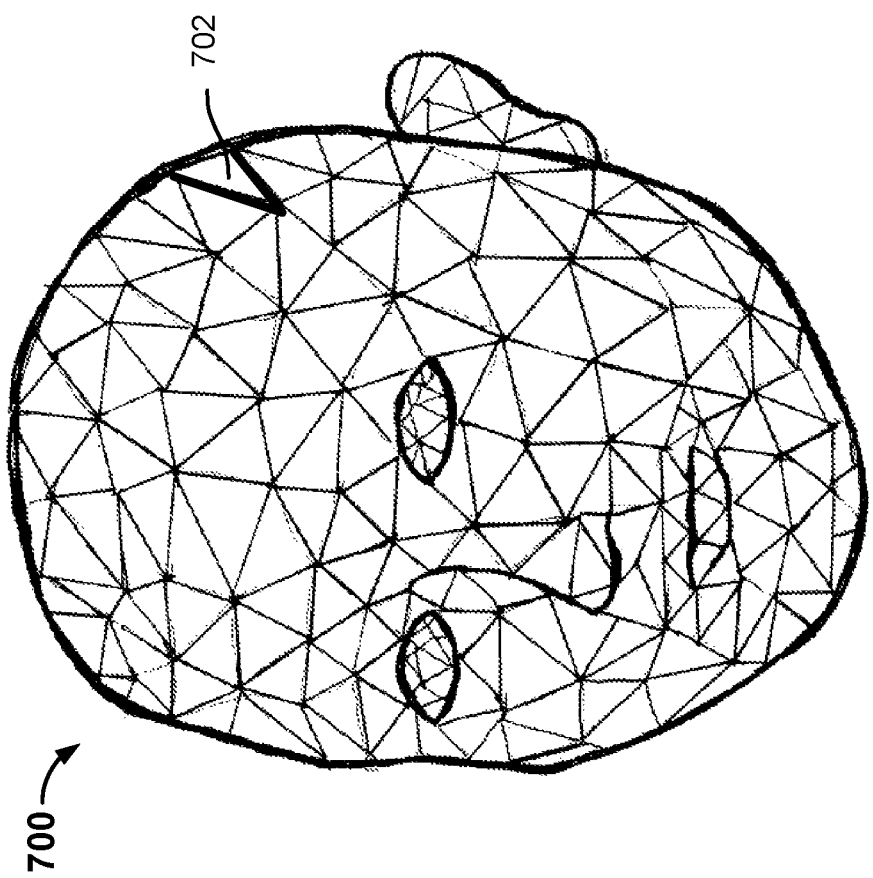
FIG. 7 is a diagram showing an example of a visualization of a 3D smoothing map in 3D space.

FIG. 7 is a diagram showing an example of a visualization of a 3D smoothing map in 3D space. In some embodiments, the 3D smoothing map comprises an .obj file. As mentioned above, a 3D smoothing map includes the coordinates of the three or more vertices of polygons on a 3D generic face and also a corresponding smoothing degree for each such polygon. In the example of FIG. 7, 3D smoothing map 700 includes triangular-shaped polygons, such as polygon 702, which are each defined in 3D space by the coordinates of their vertices, over the surface of a 3D generic face. While in the example of FIG. 7, 3D smoothing map 700 includes triangular-shaped polygons, in actual implementation, a smoothing map may include polygons of other shapes and/or other numbers of vertices as well. For example, the generic face can be predetermined and/or constructed from various previous users. During the definition or configuration of a 3D smoothing map, each polygon is assigned a smoothing degree (e.g., by an administrator) that represents to what extent that portion of a user's face should be affected by a smoothing filter. In some embodiments, the smoothing degree comprises a percentage or a value from 0 to 1. In some embodiments, the greater the smoothing degree (e.g., the closer the smoothing degree is to 100% or to 1), the greater the extent to which the image content associated with the user's face that corresponds to that polygon will be smoothed (e.g., altered by the smoothing filter) and the lower the smoothing degree (e.g., the closer the smoothing degree is to 0% or to 0), the greater the extent to which the image content associated with the user's face that corresponds to that polygon will be unaltered by the smoothing filter in the enhanced images generated using the 3D smoothing map.

The smoothing degree corresponding to each polygon, such as polygon 702, of 3D smoothing map 700 is not shown in FIG. 7. While not shown in the example of FIG. 7, the smoothing degree corresponding to a polygon of the 3D smoothing map can be represented as a shading on a greyscale, where the greater the smoothing degree corresponding to a polygon is, the lighter the shading of that polygon is and where the lower the smoothing degree corresponding to a polygon is, the darker the shading of that polygon is.

In various embodiments, it is desired to emphasize smoothing in images of a user's face on portions of the user's face that are associated with wrinkles and/or other undesirable facial blemishes. As such, the polygons of the 3D smoothing map that are commonly associated with wrinkles (e.g., eye corners, mouth corners, forehead, etc.) that are desired to be smoothed in the images can be associated with higher smoothing degrees. Conversely, polygons of the 3D smoothing map that are not commonly associated with wrinkles (e.g., eyes, nose, lips, etc.) that are not desired to be smoothed in the images can be associated with lower smoothing degrees. Referring to 3D smoothing map 700 of FIG. 7, for example, the polygons around the generic face's cheeks may be assigned with lower smoothing degrees while the polygons included in the generic face's eye corners may be assigned higher smoothing degrees.

FIG. 8 is a diagram showing an example of a visualization of a 3D model of a user's face in 3D space. For example, 3D model of a user's face 800 was constructed using a set of images (Images 1 through 5) of FIG. 5. For example, 3D model of a user's face 800 was determined based on a set of reference points associated with features on the user's face from the set of images. Examples of reference points include endpoints of the user's eye, bridge of the user's nose, and tip of the user's nose. In some embodiments, 3D model of a user's face 800 was determined using a process such as process 400 of FIG. 4.

FIG. 9 is a diagram showing an example of a visualization of a morphed 3D smoothing map in 3D space. In some embodiments, a 3D smoothing map is morphed to match a 3D model of a user's face. In the example of FIG. 9, morphed 3D smoothing map 900 was the product of morphing 3D smoothing map 700 of FIG. 7 to match 3D model of a user's face 800 of FIG. 8. Morphing 3D smoothing map 700 of FIG. 7 to match 3D model of a user's face 800 of FIG. 8 includes, for example, moving the coordinates of the vertices of the polygons of 3D smoothing map 700 of FIG. 7 to corresponding locations on 3D model of a user's face 800 of FIG. 8 in 3D space, while maintaining the smoothing degrees corresponding to the respective polygons. As such, morphed 3D smoothing map 900 includes polygons of 3D smoothing map 700 of FIG. 7 that have been mapped to the surface of the user's face 800 of FIG. 8. The smoothing degree corresponding to each polygon of morphed 3D smoothing map 900 is not shown in FIG. 9, but as mentioned before, the smoothing degree of each polygon can be represented as a shading on a greyscale, where the greater the smoothing degree corresponding to a polygon is, the lighter the shading of that polygon is and where the lower the smoothing degree corresponding to a polygon is, the darker the shading of that polygon is.

Figure 10:
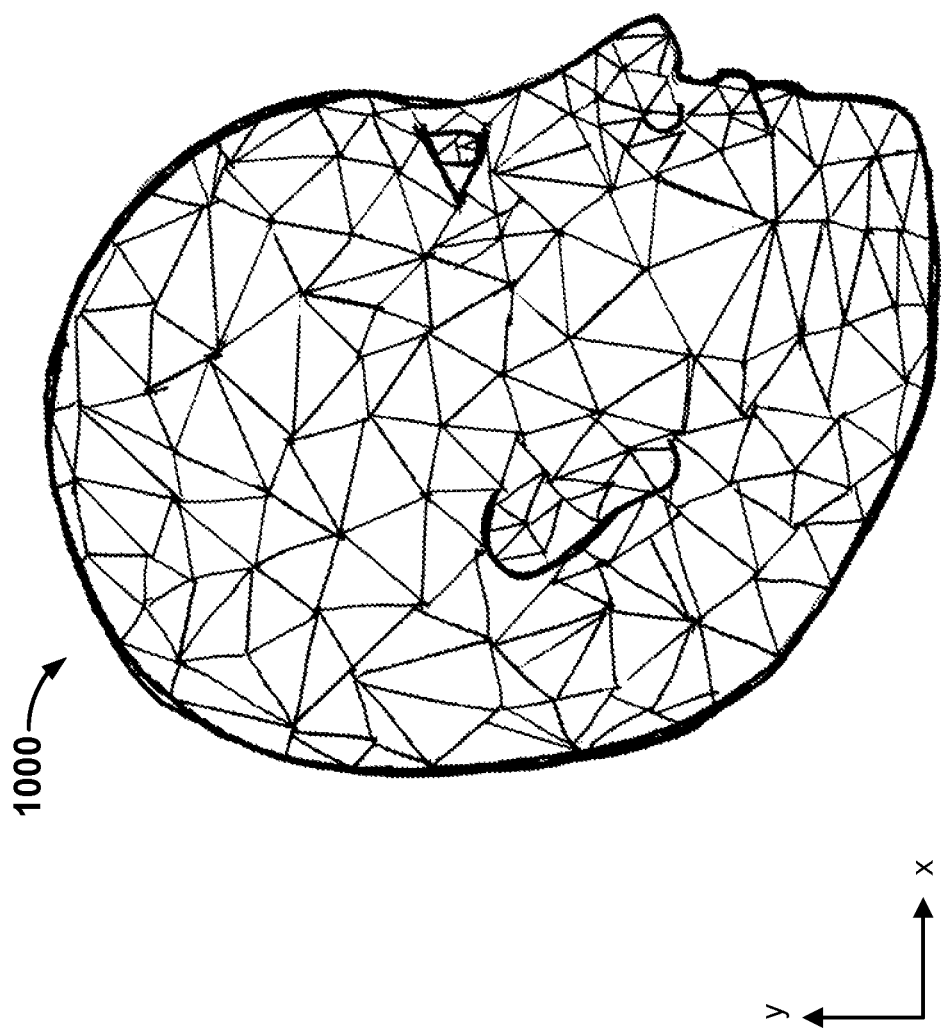
FIG. 10 is a diagram showing an example of a visualization of a 2D smoothing mask corresponding to an image in 2D space.

FIG. 10 is a diagram showing an example of a visualization of a 2D smoothing mask corresponding to an image in 2D space. In some embodiments, a 2D smoothing mask corresponding to each image of a set of images is determined by using the set of extrinsic information corresponding to the image and a set of intrinsic information corresponding to a camera to project the morphed 3D smoothing map onto a 2D surface of the focal plane of the camera. In the example of FIG. 10, 2D smoothing mask 1000 corresponds to Image 5 of FIG. 5 and was generated by projecting morphed 3D smoothing map 900 of FIG. 9 onto the 2D space surface using the set of extrinsic information corresponding to Image 5 of FIG. 5, $E_5$, and the set of intrinsic information (e.g., an I matrix). Note that 2D smoothing mask 1000 is a 2D projection of morphed 3D smoothing map 900 of FIG. 9 having been transformed to match the orientation of the user's face in Image 5 of FIG. 5 with the set of extrinsic information corresponding to Image 5 of FIG. 5, $E_5$. As such, 2D smoothing mask 1000 includes polygons of morphed 3D smoothing map 900 of FIG. 9 that are visible after the morphed 3D smoothing map 900 was transformed to match the orientation of the user's face in Image 5 of FIG. 5 with the set of extrinsic information corresponding to Image 5 of FIG. 5, $E_5$. The smoothing degree corresponding to each polygon of 2D smoothing mask 1000 is not shown in FIG. 10. While not shown in FIG. 10, as mentioned above, the smoothing degree corresponding to a polygon of 2D smoothing mask 1000 can be represented as a shading on a greyscale, where the greater the smoothing degree corresponding to a polygon is, the lighter the color of that polygon is and where the lower the smoothing degree corresponding to a polygon is, the darker the color of that polygon is. As such, 2D smoothing mask 1000 can be visualized as a greyscale image. For example, 2D smoothing mask 1000 can be a greyscale image (e.g., of any image format) or a matrix of greyscale pixel values. In some embodiments, because 2D smoothing mask 1000 was generated using the set of extrinsic information corresponding to Image 5 of FIG. 5, $E_5$, 2D smoothing mask 1000 can also be referred to as $\alpha_5$.

Figure 11:
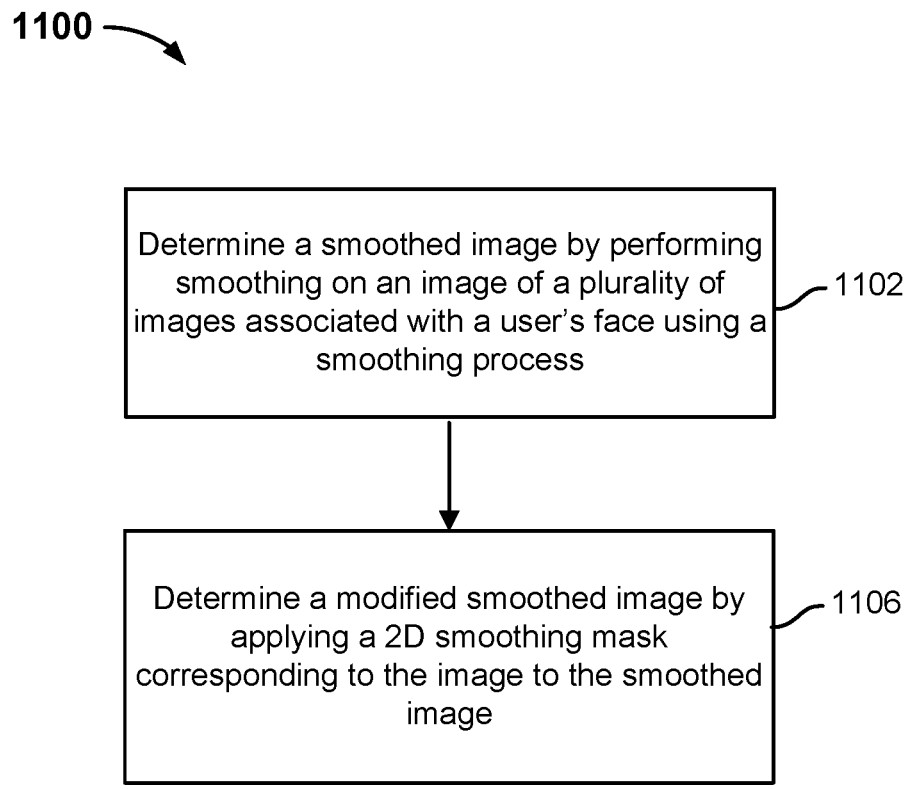
FIG. 11 is a flow diagram showing an embodiment of a process for generating a smoothed image corresponding to an image using the 2D smoothing mask corresponding to the image.

FIG. 11 is a flow diagram showing an embodiment of a process for generating a smoothed image corresponding to an image using the 2D smoothing mask corresponding to the image. In some embodiments, process 1100 is implemented at system 100 of FIG. 1. In some embodiments, 608 of process 600 of FIG. 6 is implemented at least in part on using process 1100.

At 1102, a smoothed image is determined by performing smoothing on an image of a plurality of images associated with a user's face using a smoothing process. In various embodiments, a smoothing process is applied to the entire image. In some embodiments, the smoothing process comprises blurring the image with a Gaussian kernel. Blurring the image with a Gaussian kernel includes computing a new pixel value for each pixel of the image based on a weighted average of the pixel values in that pixel's neighborhood. The original pixel's value receives the heaviest weight (e.g., having the highest Gaussian value) and neighboring pixels receive smaller weights as their distance to the original pixel increases.

In some embodiments, the image is blurred with a Gaussian kernel by convolving the image with a kernel of Gaussian values. A "kernel" comprises a matrix of values. The size of the kernel determines the size of the neighborhood of pixels that will be used to compute the new pixel value of the center pixel. Generally, the larger the kernel size used, the greater the smoothing will be applied to the image. In some embodiments, as will be described in further detail below, the kernel size used in applying the Gaussian kernel smoothing process may be adjusted for each image of a set of images or at least a portion of each image based on one or more factors. For example, a factor that can be used to determine the appropriate Gaussian kernel size to use to blur an image includes the size of the image.

For example, original image N (of M images in a set) can be referred to as $I_N$ and the smoothed version of the image N can be represented as Smoothed($I_N$).

At 1106, a modified smoothed image is determined by applying a 2D smoothing mask corresponding to the image to the smoothed image. In some embodiments, the smoothed image is modified by multiplying the smoothed image with the 2D smoothing mask corresponding to the image. For example, multiplying the smoothed image with the 2D smoothing mask includes multiplying each channel (e.g., Red, Green, and Blue) value of each pixel of the smoothed image with the greyscale value from the corresponding pixel of the 2D smoothing mask ($\alpha_N$). Put another way, the 2D smoothing mask can be thought of as being placed over the smoothed image and a channel value of each pixel of the smoothed image is determined by multiplying the channel value of each pixel of the smoothed image with the smoothing degree associated with the polygon on the 2D smoothing mask that overlays the pixel. Modifying the smoothed image by the corresponding 2D smoothing mask emphasizes (by weighting more heavily the pixel values of) the smoothed portions of the smoothed image that correspond to polygons of the 2D smoothing mask with higher smoothing degrees and deemphasizes (by weighting less heavily the pixel values of) the smoothed portions of the smoothed image that correspond to polygons of the 2D smoothing mask with lower smoothing degrees. For example, if the polygon of the 2D smoothing mask were assigned a lower smoothing degree (e.g., an eye pupil), then the modified pixel values of the modified smoothed image corresponding to that polygon would be less heavily weighted by the smoothing degree. Conversely, if the polygon of the 2D smoothing mask were assigned a higher smoothing degree (e.g., a region next to an eye corner), then the modified pixel values of the smoothed image corresponding to that polygon would be more heavily weighted by the smoothing degree.

For example, the modified smoothed image N can be represented as $[(\alpha_N)*\text{Smoothed}(I_N)]$.

Figure 12:
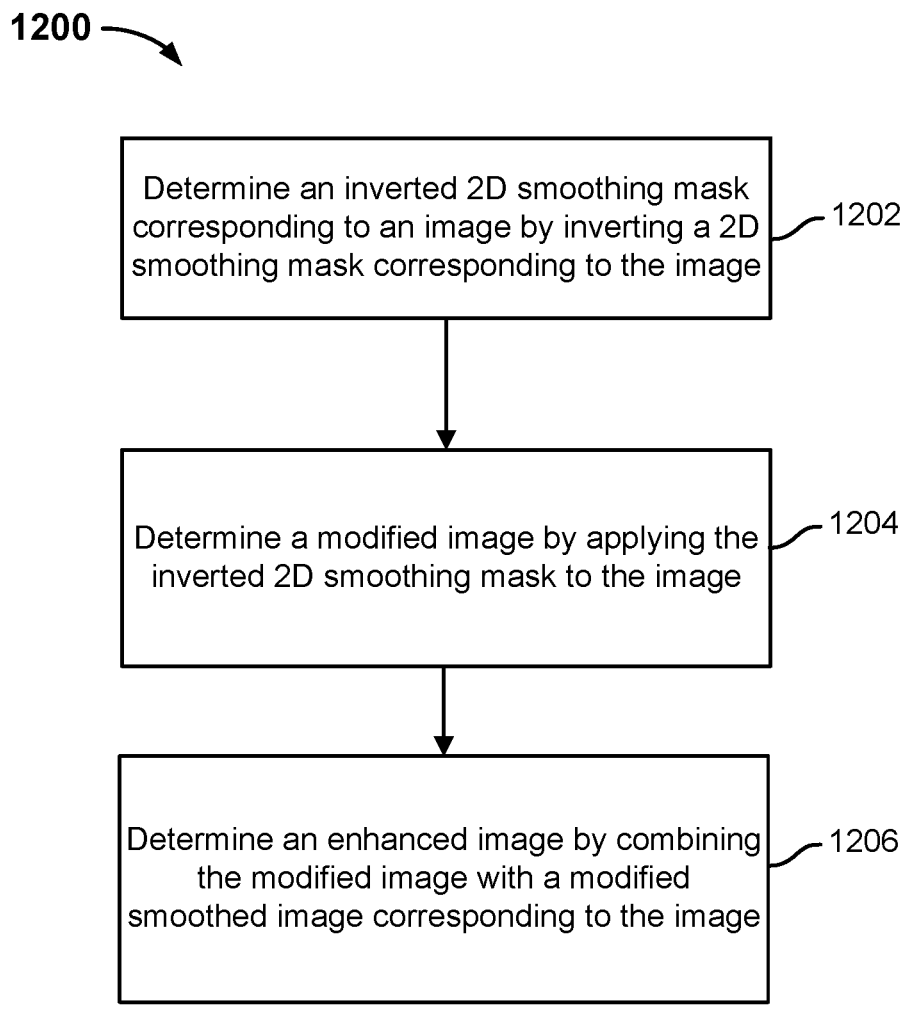
FIG. 12 is a flow diagram showing an embodiment of a process for generating an enhanced image corresponding to an image.

FIG. 12 is a flow diagram showing an embodiment of a process for generating an enhanced image corresponding to an image. In some embodiments, process 1200 is implemented at system 100 of FIG. 1. In some embodiments, 610 of process 600 of FIG. 6 is implemented at least in part on using process 1200.

At 1202, an inverted 2D smoothing mask corresponding to an image is determined by inverting a 2D smoothing mask corresponding to the image. In some embodiments, the 2D smoothing mask corresponding to an image may be inverted by assigning an inverted smoothing degree to each polygon of the 2D smoothing mask that is the difference between the maximum smoothing degree (e.g., 1) and the smoothing degree of the polygon. In some embodiments, the definitions (e.g., coordinates of the vertices) of polygons are unchanged in the inverted 2D smoothing mask. For example, if a polygon of a smoothing mask is associated with a smoothing degree of 0.7, then the inverted smoothing degree for that polygon would be (1−0.7=) 0.3.

For example, for image N, the corresponding 2D smoothing mask can be represented as $\alpha_N$. As mentioned above, a 2D smoothing mask comprises a greyscale mask/image, in which a polygon with a higher smoothing degree value (corresponding to a value closer to 1) is colored in with a lighter shade and a polygon with a lower smoothing degree value (corresponding to a value closer to 0) is colored in with a darker shade. As such, the inverted 2D smoothing mask corresponding to image N can be referred to as $(1-\alpha_N)$. The inverted 2D smoothing mask would appear as an inverted greyscale mask/image relative to the 2D smoothing mask.

At 1204, a modified image is determined by applying the inverted 2D smoothing mask to the image. In some embodiments, the original image is modified by multiplying the image with the inverted 2D smoothing mask. For example, multiplying the image with the 2D smoothing mask includes multiplying each channel (e.g., Red, Green, and Blue) value of each pixel of the original image with the greyscale value from the corresponding pixel of the inverted 2D smoothing mask $(1-\alpha_N)$. Put another way, the inverted 2D smoothing mask can be thought of as being placed over the original image and a new channel value of each pixel of the image is determined by multiplying the channel value of each pixel of the image with the inverted smoothing degree associated with the polygon on the inverted 2D smoothing mask that overlays the pixel. Modifying the image by the corresponding inverted 2D smoothing mask emphasizes (by weighting more heavily the pixel values of) the portions of the original image that correspond to polygons of the 2D smoothing mask with lower smoothing degrees and deemphasizes (by weighting less heavily the pixel values of) the smoothed portions of the smoothed image that correspond to polygons of the 2D smoothing mask with higher smoothing degrees. For example, if the polygon of the 2D smoothing mask were assigned a lower smoothing degree (e.g., an eye pupil), then the modified pixel values of the modified image corresponding to that polygon would be more heavily weighted by the inverted smoothing degree. Whereas, if the polygon of the 2D smoothing mask were assigned a higher smoothing degree (e.g., a region next to an eye corner), then the modified pixel values of the modified image corresponding to that polygon would be less heavily weighted by the inverted smoothing degree.

For example, original image N (of M images in a set) can be referred to as $I_N$ and the corresponding inverted 2D smoothing mask for image N can be represented as $(1-\alpha_N)$. As mentioned above, inverted 2D smoothing mask $(1-\alpha_N)$ comprises a greyscale mask/image, in which a polygon with a lower inverted smoothing degree value (corresponding to a value closer to 0) is colored in with a darker shade and a polygon with a higher inverted smoothing degree value (corresponding to a value closer to 1) is colored in with a lighter shade. As such, the modified image N can be represented as $[(1-\alpha_N)*I_N]$.

At 1206, an enhanced image is determined by combining the modified image with a modified smoothed image corresponding to the image. In some embodiments, the enhanced image is generated by adding the modified image to a modified smoothed image (e.g., that was determined for the image using a process such as process 1100 of FIG. 11).

For example, the enhanced version of image N can be represented as Enhanced($I_N$). Enhanced($I_N$) can be generated by adding together modified image $[(1-\alpha_N)*I_N]$ and modified smoothed image $[\alpha_N*\text{Smoothed}(I_N)]$ (e.g., that was determined for image $I_N$ using a process such as process 1100 of FIG. 11). As such, an example formula for generating enhanced image N is the following:

$$\text{Enhanced}(I_N) = [(1-\alpha_N)*I_N] + [\alpha_N*\text{Smoothed}(I_N)] \quad (1)$$

By using formula (1) to generate each enhanced image, the enhanced image includes the combination of a modified version of the image for which the polygons associated with facial features that were desired to be preserved (e.g., eyes, nose, lips, etc.) are emphasized and another modified smoothed version of the image for which the blurring of polygons associated with facial features that were not as desired to be preserved (e.g., polygons of the skin that are commonly associated with wrinkles and/or other undesirable blemishes) are emphasized. Each enhanced image should therefore preserve the desired facial features of the original image while intelligently smoothing the less desired facial features of the original image to give the user's face an overall more flattering appearance.

Figure 13:
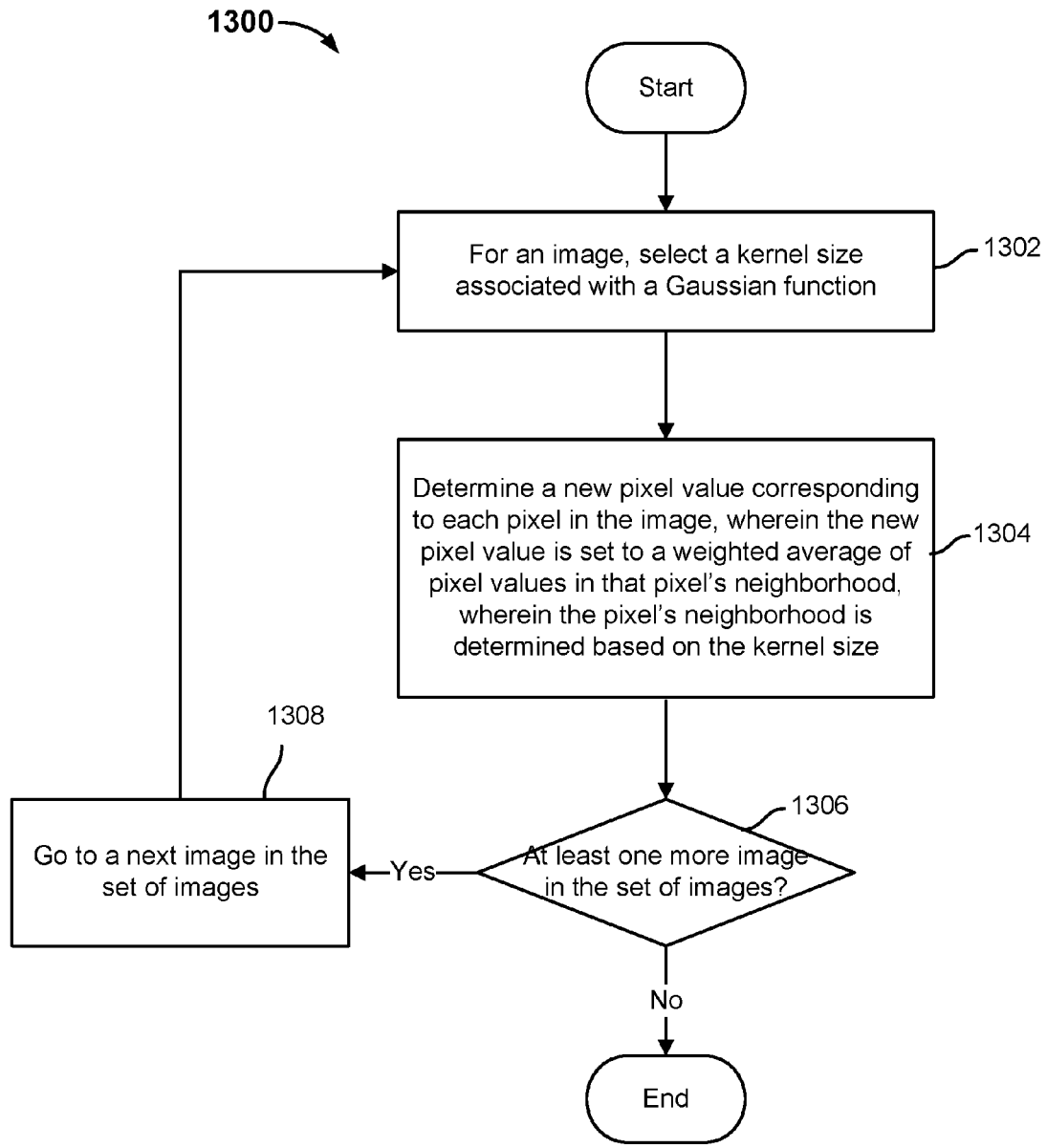
FIG. 13 is a flow diagram showing an example of a process for performing smoothing on an image.

FIG. 13 is a flow diagram showing an example of a process for performing smoothing on an image. In some embodiments, process 1300 is implemented at system 100 of FIG. 1. In some embodiments, 1102 of process 1100 of FIG. 11 is implemented at least in part on using process 1300.

Process 1300 describes an example of customizing the smoothing for each image.

At 1302, for an image, a kernel size associated with a Gaussian kernel is selected. For an image of a set of images, a kernel size associated with the Gaussian kernel to be applied to that image is selected.

In some embodiments, the selected kernel size for the image is associated with a corresponding 2D matrix of Gaussian values or weights. FIGS. 14A and 14B each shows an example Gaussian kernel of a particular size. FIG. 14A shows an example kernel associated with the size of 3×3 pixels and the corresponding Gaussian values. FIG. 14B shows an example kernel associated with the size of 5×5 pixels and the corresponding Gaussian values. For example, either of the 3×3 or 5×5 kernels can be used to smooth an image by convolving the kernel with the image. For example, if the 3×3 kernel were selected, then a new pixel value corresponding to the center pixel of the kernel would be set based on the weighted average pixel values of the neighborhood eight pixels and its own weighted pixel value (0.25). Because the new pixel value of a pixel is determined based on the weighted pixel values of neighboring pixels, the appearance of the smoothed pixel appears more blurred with its surrounding pixels. Generally, the larger the kernel size, the greater the smoothing/blurring effects will be achieved for the smoothed image. As such, the 5×5 kernel of FIG. 14B will result in more blurring than the 3×3 kernel of FIG. 14A if convolved with an image. In some embodiments, the kernel size for the image can be selected based on a desire for more or less smoothing/blurring effects in that image.

Returning to FIG. 13, at 1304, a new pixel value corresponding to each pixel in the image is determined, wherein the new pixel value is set to a weighted average of pixel values in that pixel's neighborhood, wherein the pixel's neighborhood is determined based on the kernel size. A new pixel value is determined for each pixel of the image by computing the weighted average of the pixel values of all the pixels included in the kernel associated with the selected kernel size. Put another way, a new pixel value is determined for each pixel of the image by convolving the image with a Gaussian kernel of the selected kernel size.

At 1306, it is determined whether there is at least one more image in the set of images. In the event that there is at least one more image in the set of images, control is transferred to 1308, at which a next image of the set of images is selected for processing at 1302 and 1304. If there is at least one more image of the set of images that has not yet been smoothed, the next image is selected and processed. Otherwise, in the event that there are not more images in the set, process 1300 ends.

Figure 15:
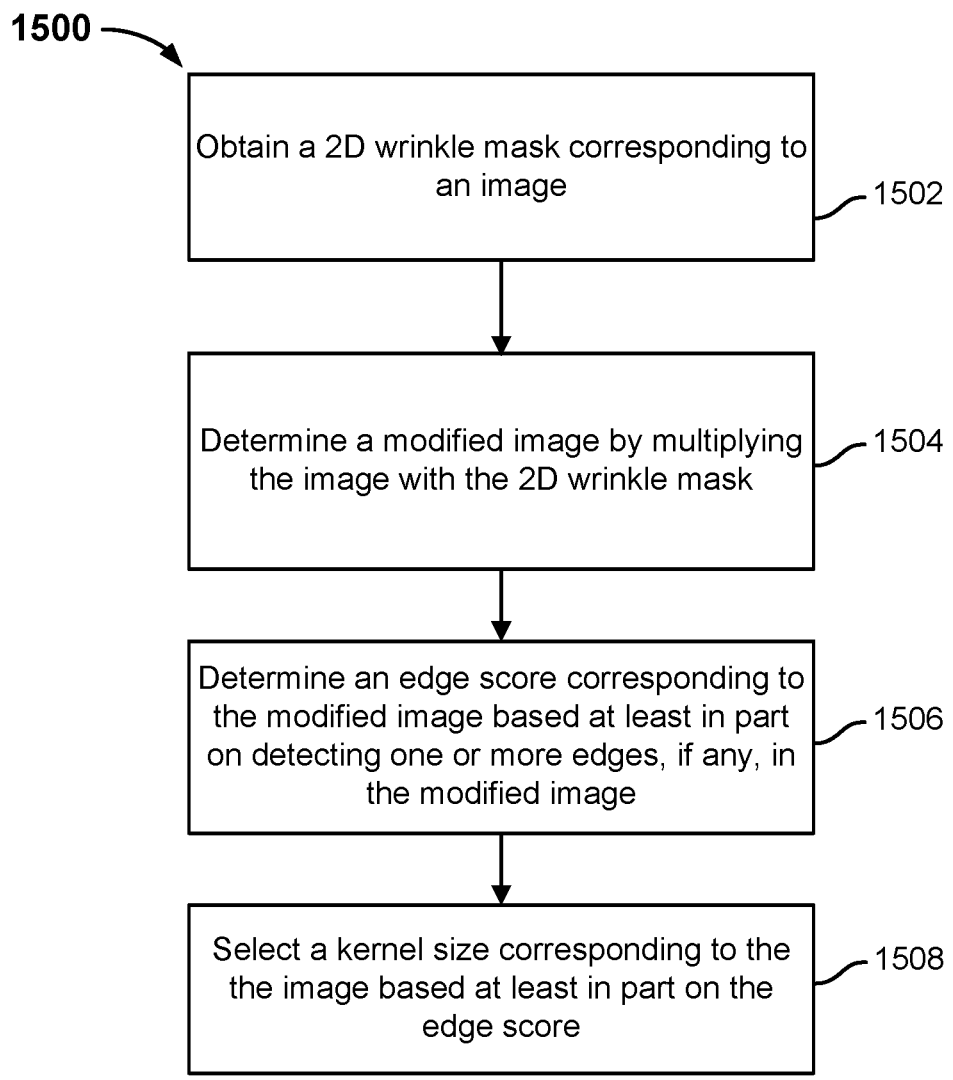
FIG. 15 is a flow diagram showing an example of a process for selecting a kernel size associated with a Gaussian kernel for an image.

FIG. 15 is a flow diagram showing an example of a process for selecting a kernel size associated with a Gaussian kernel for an image. In some embodiments, process 1500 is implemented at system 100 of FIG. 1. In some embodiments, 1302 of process 1300 of FIG. 13 is implemented at least in part on using process 1500.

Process 1500 is an example process of selecting a kernel size associated with a Gaussian kernel to use to perform smoothing/blurring on a particular image of a set of images. For example, a kernel size that will lead to greater smoothing of the image can be selected if it is determined that more smoothing is desired for the image (e.g., because there are more wrinkles and/or other facial blemishes detected in that image) and a kernel size that will lead to less smoothing of the image can be selected if it is determined that more smoothing is not as desired for the image (e.g., because there are fewer wrinkles and/or other facial blemishes detected in that image).

At 1502, a 2D wrinkle mask corresponding to an image is obtained. A 2D wrinkle mask can be determined for each image of a set of images.

For example, the 2D wrinkle mask can be determined by the following example technique: A 3D wrinkle map is obtained. The 3D wrinkle map describes various polygons that cover a generic face in 3D space and also a wrinkle prediction value associated with each polygon. The wrinkle prediction value associated with each polygon of the 3D generic face describes a binary prediction as to whether wrinkle(s) may be found in a portion of an original image of the user's face corresponding to that polygon. For example, the wrinkle prediction value is a binary (e.g., 0 or 1) value that is configured by an administrator. In some embodiments, the wrinkle prediction value associated with a polygon of the 3D generic face that is associated with a facial feature that may likely include wrinkles (e.g., eye corners, mouth corners, forehead) can be assigned a wrinkle prediction value (e.g., 1) that indicates that wrinkles could likely be found in that region of the original image of the user's face corresponding to that polygon. Conversely, the wrinkle prediction value associated with a polygon of the 3D generic face that is associated with a facial feature that may likely not include wrinkles (e.g., cheeks, nose) can be assigned a wrinkle prediction value (e.g., 0) that indicates that wrinkles are likely not found in that region of the original image of the user's face corresponding to that polygon. The polygons of the 3D wrinkle map that are each assigned a wrinkle prediction value (e.g., 1) that indicates that wrinkles could likely be found in that region can be represented as a white color and the polygons of the 3D wrinkle map that are each assigned a wrinkle prediction value (e.g., 0) that indicates that wrinkles are not likely found in that region can be represented as a black color. Note that while both the 3D smoothing map and the 3D wrinkle map include polygons associated with a 3D generic face, the 3D smoothing map and the 3D wrinkle map are different, as each includes different types of values associated with their respective polygons and may also include different polygons. The 3D wrinkle map is then morphed to match the previously determined 3D model of the user's face (e.g., the 3D model of the user's face could have been determined using a process such as process 400 of FIG. 4). The 3D wrinkle map can be morphed to match the previously determined 3D model of the user's face in a manner similar to how the 3D smoothing map was morphed to match the previously determined 3D model of the user's face, as described above. A 2D wrinkle mask corresponding to an image can then be generated by transforming the morphed 3D wrinkle map by the previously determined set of extrinsic information corresponding to the image (e.g., the set of extrinsic information corresponding to the image could have been determined using a process such as process 400 of FIG. 4) and the intrinsic information associated with a camera. The 2D wrinkle mask corresponding to an image comprises the polygons of the morphed 3D wrinkle map that are visible after the morphed 3D wrinkle map was transformed to match the orientation of the user's face in the image. The wrinkle prediction value associated with a polygon from a 2D wrinkle mask corresponding to an image comprises a binary value (e.g., 0 or 1), representing whether wrinkles are predicted to be found in that portion of the user's face in that image.

In the example of FIG. 15, assume that the wrinkle prediction value in each polygon of the 2D wrinkle mask is a binary value of either 0 or 1, for example, where a wrinkle prediction value of 1 indicates that wrinkles could likely be found in that polygon and a wrinkle prediction value of 0 indicates that wrinkles could not likely be found in that region.

At 1504, a modified image is determined by multiplying the image with the 2D wrinkle mask. The pixel values in the original image that correspond to the polygon of the 2D wrinkle mask are multiplied by the wrinkle prediction value assigned to that polygon of the 2D wrinkle mask. Put another way, the 2D wrinkle mask can be thought of as being placed over the original image and a channel value (e.g., Red, Green, Blue) of each pixel of the image is determined by multiplying the channel value of each pixel of the image with the wrinkle prediction value associated with the polygon on the 2D wrinkle mask that overlays the pixel. Because in the 2D wrinkle mask, the wrinkle prediction value of a polygon that is indicated to likely include wrinkles is 1 and the inverted wrinkle prediction value of a polygon that is indicated to not likely include wrinkles is 0, after the original image is multiplied by the 2D wrinkle mask, only the portions of the original image that correspond to the polygons of the 2D wrinkle mask that have been indicated to likely include wrinkles remain (because the other portions have been multiplied by 0) in the modified image.

One purpose of multiplying the image with the corresponding 2D wrinkle mask is to retain only the polygons of the face in which wrinkles are likely found such that an edge detection process of 1506, below, can focus on detecting for edges in those relevant portions of the image.

At 1506, an edge score corresponding to the modified image is determined based at least in part on detecting one or more edges, if any, in the modified image. In some embodiments, detected edges in the modified image are assumed to be associated with wrinkles and/or other undesirable blemishes. For example, applying detection to the modified image includes multiplying the pixel values of the modified image with a function and determining whether the magnitude of the response is large enough to warrant a detected edge. In some embodiments, the more edges that are detected in the modified image, the higher the edge score that is determined for that image and the greater the presumption that more wrinkles and/or other undesirable blemishes are present in that image.

At 1508, a kernel size corresponding to the image is selected based at least in part on the edge score. In some embodiments, the larger the edge score, the larger the kernel size that is selected for the image. The greater the kernel size that is used to smooth the image, the greater the degree of smoothing that will result in that image. In some embodiments, a mapping of different ranges of edge scores to different predetermined kernel sizes (e.g., 3×3, 5×5, 7×7, etc.) can be used to select an appropriate kernel size for the image based on the determined edge score for that image. For example, if several wrinkles and/or other blemishes are present in an image, then the edge score determined for the image can be relatively high, which will map to a larger kernel size to be selected for the image. Then, the smoothing in that image can be relatively heavy to diminish the undesirable appearance of the wrinkles and/or other blemishes in the smoothed image, which will ultimately be used to generate a better, enhanced image.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
a processor configured to:
determine a modified smoothing map by modifying a model smoothing map to correspond to a representation of a user's face; and
determine an enhanced image corresponding to an image of the user's face based at least in part on a set of extrinsic information corresponding to the image of the user's face, the modified model smoothing map, and the image of the user's face; and
a memory coupled to the processor and configured to provide the processor with instructions.

2. The system of claim 1, wherein the processor is further configured to obtain the representation of the user's face based at least in part on a set of images associated with the user's face.

3. The system of claim 1, wherein the processor is further configured to obtain the set of extrinsic information corresponding to the image of the user's face.

4. The system of claim 1, wherein the model smoothing map comprises (1) coordinates of a plurality of polygons associated with a three-dimensional (3D) first face and (2) a plurality of smoothing degrees corresponding to respective ones of the plurality of polygons.

5. The system of claim 4, wherein to determine the modified smoothing map by modifying the model smoothing map to correspond to the representation of the user's face includes to modify the coordinates of the plurality of polygons associated with the 3D first face based at least in part on corresponding locations associated with the representation of the user's face.

6. The system of claim 1, wherein to determine the enhanced image includes to use the modified model smoothing map and at least the set of extrinsic information corresponding to the image of the user's face to determine a two-dimensional (2D) smoothing mask corresponding to the image of the user's face.

7. The system of claim 6, wherein to determine the enhanced image further includes to generate a smoothed image by performing smoothing on the image based at least in part on the 2D smoothing mask corresponding to the image.

8. The system of claim 7, wherein to generate the smoothed image includes to determine a modified smoothed image by applying the 2D smoothing mask to the smoothed image.

9. The system of claim 8, wherein to determine the enhanced image further includes to:
determine an inverted 2D smoothing mask corresponding to the image by inverting the 2D smoothing mask corresponding to the image;
determine a modified image by applying the inverted 2D smoothing mask to the image; and
determine the enhanced image by combining the modified image and the modified smoothed image.

10. The system of claim 9, wherein combining the modified image and the modified smoothed image comprises adding the modified image to the modified smoothed image.

11. The system of claim 7, wherein to generate the smoothed image includes to select a kernel size associated with a Gaussian kernel to use to apply smoothing on the image.

12. The system of claim 11, wherein to select the kernel size associated with the Gaussian kernel to use to apply smoothing on the image includes to:
obtain a two-dimensional (2D) wrinkle mask corresponding to the image;
determine a modified image by applying the 2D wrinkle mask to the image;
determine an edge score corresponding to the modified image based at least in part on detecting one or more edges, if any, in the modified image; and
select the kernel size based at least in part on the edge score corresponding to the modified image.

13. The system of claim 12, wherein to obtain the 2D wrinkle mask includes to:
determine a modified wrinkle map by modifying a wrinkle map to correspond to the representation of the user's face; and
use the modified wrinkle map and at least the set of extrinsic information corresponding to the image of the user's face to determine the 2D wrinkle mask corresponding to the image of the user's face.

14. A method, comprising:
determining, using one or more processors, a modified smoothing map by modifying a model smoothing map to correspond to a representation of a user's face; and
determining an enhanced image corresponding to an image of the user's face based at least in part on a set of extrinsic information corresponding to the image of the user's face, the modified model smoothing map, and the image of the user's face.

15. The method of claim 14, wherein the model smoothing map comprises (1) coordinates of a plurality of polygons associated with a three-dimensional (3D) first face and (2) a plurality of smoothing degrees corresponding to respective ones of the plurality of polygons.

16. The method of claim 15, wherein determining the modified smoothing map by modifying the model smoothing map to correspond to the representation of the user's face includes modifying the coordinates of the plurality of polygons associated with the 3D first face based at least in part on corresponding locations associated with the representation of the user's face.

17. The method of claim 14 wherein determining the enhanced image includes using the modified model smoothing map and at least the set of extrinsic information corresponding to the image to determine a two-dimensional (2D) smoothing mask corresponding to the image.

18. The method of claim 17, wherein determining the enhanced image further includes generating a smoothed image by performing smoothing on the image based at least in part on the 2D smoothing mask corresponding to the image.

19. The method of claim 18, wherein generating the smoothed image includes determining a modified smoothed image by applying the 2D smoothing mask to the smoothed image.

20. The method of claim 19, wherein determining the enhanced image further includes:
determining an inverted 2D smoothing mask corresponding to the image by inverting the 2D smoothing mask corresponding to the image;
determining a modified image by applying the inverted 2D smoothing mask to the image; and
determining the enhanced image by combining the modified image and the modified smoothed image.

21. The method of claim 20, wherein combining the modified image and the modified smoothed image comprises adding the modified image to the modified smoothed image.

22. The method of claim 18, wherein generating the smoothed image includes selecting a kernel size associated with a Gaussian kernel to use to apply smoothing on the image.

23. A computer program product, the computer program product being embodied in a non-transitory computer readable storage medium and comprising computer instructions for:
- determining a modified smoothing map by modifying a model smoothing map to correspond to a representation of a user's face; and
- determining an enhanced image corresponding to an image of the user's face based at least in part on a set of extrinsic information corresponding to the image of the user's face, the modified model smoothing map, and the image of the user's face.

* * * * *